(12) United States Patent
Maguin

(10) Patent No.: US 12,222,229 B2
(45) Date of Patent: Feb. 11, 2025

(54) METHOD FOR MEASURING A LIQUID FLOW RATE AT THE OUTLET OF A PUMP

(71) Applicant: VITESCO TECHNOLOGIES GMBH, Regensburg (DE)

(72) Inventor: Georges Maguin, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 143 days.

(21) Appl. No.: 17/800,163

(22) PCT Filed: Feb. 9, 2021

(86) PCT No.: PCT/EP2021/053065
§ 371 (c)(1),
(2) Date: Aug. 16, 2022

(87) PCT Pub. No.: WO2021/165096
PCT Pub. Date: Aug. 26, 2021

(65) Prior Publication Data
US 2023/0074405 A1    Mar. 9, 2023

(30) Foreign Application Priority Data

Feb. 17, 2020 (FR) ........................ 2001558

(51) Int. Cl.
*G01F 1/34* (2006.01)
*G01F 1/00* (2022.01)
*G01F 22/02* (2006.01)

(52) U.S. Cl.
CPC ................ *G01F 1/34* (2013.01); *G01F 1/007* (2013.01); *G01F 22/02* (2013.01)

(58) Field of Classification Search
CPC ............. G01F 1/007; G01F 1/34; G01F 22/02
See application file for complete search history.

(56) References Cited

U.S. PATENT DOCUMENTS

| 4,589,280 | A | * | 5/1986 | Carter | .................... A61B 5/208 |
| | | | | | 600/573 |
| 8,959,997 | B2 | * | 2/2015 | Hanko | .................... G01F 22/02 |
| | | | | | 73/290 R |
| 9,163,966 | B2 | * | 10/2015 | Lamkemeyer | ...... B05C 11/1013 |
| 9,765,668 | B2 | | 9/2017 | Maus et al. | |

(Continued)

FOREIGN PATENT DOCUMENTS

CN      206625888 U  *  11/2017
DE  10 2018 209 858     12/2019

OTHER PUBLICATIONS

International Search Report dated Apr. 9, 2021, for PCT/EP2021/053065, 5 pp., including English translation.

(Continued)

*Primary Examiner* — Justin N Olamit
(74) *Attorney, Agent, or Firm* — NIXON & VANDERHYE

(57) ABSTRACT

This method for measuring a flow rate of liquid at the outlet of a pump is noteworthy in that a gas accumulator of known volume is provided at the outlet of this pump, in that the gas or liquid pressure inside this accumulator is measured, in that the volume of gas inside this accumulator is deduced therefrom, then the volume of the liquid inside this accumulator, then the flow rate of this liquid at the outlet of this accumulator.

8 Claims, 3 Drawing Sheets

(56) References Cited

U.S. PATENT DOCUMENTS

2013/0104668 A1    5/2013  Hanko et al.
2014/0338311 A1*  11/2014  Brueck ................. F01N 3/2066
                                                              60/287
2015/0096386 A1    4/2015  Lamkemeyer et al.

OTHER PUBLICATIONS

Written Opinion of the ISA dated Apr. 9, 2021, for PCT/EP2021/053065, 6 pp.

\* cited by examiner

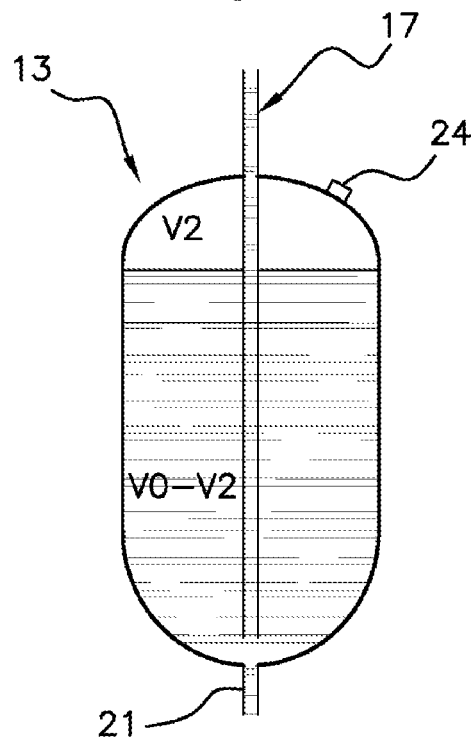
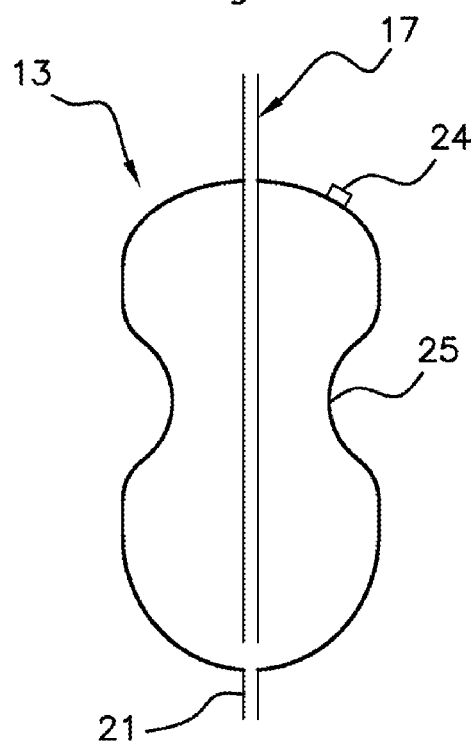

METHOD FOR MEASURING A LIQUID FLOW RATE AT THE OUTLET OF A PUMP

CROSS-REFERENCE TO RELATED APPLICATION(S)

This application is the U.S. national phase of International Application No. PCT/EP2021/053065 filed Feb. 9, 2021, which designated the U.S. and claims priority to FR 2001558 filed Feb. 17, 2020, the entire contents of each of which are hereby incorporated by reference.

BACKGROUND OF THE INVENTION

Field of the Invention

The present invention relates to a method for measuring a liquid flow rate at the outlet of a pump, and finds its application in particular in the automotive field.

Description of the Related Art

Various methods and devices are known from the prior art for measuring a liquid flow rate at the outlet of a pump: these prior methods and devices typically use flowmeters or volumetric pumps.

The cost of these flowmeters and of these volumetric pumps is relatively high, and their reliability is questionable.

SUMMARY OF THE INVENTION

The objective of the present invention is thus in particular to provide means for measuring the flow rate of liquid at the outlet of a pump that make it possible to reduce costs and remain reliable over time.

This objective, as well as others which will appear on reading the following description, is achieved with a method for measuring a flow rate of liquid at the outlet of a pump, which is noteworthy in that a gas accumulator of known volume is provided at the outlet of this pump, with, in its bottom intended to be positioned downward in service, an inlet of said liquid exiting from the pump, in that the gas or of liquid pressure inside this accumulator is measured, in that the volume of gas inside this accumulator is deduced therefrom, then the volume of said liquid inside this accumulator, then the flow rate of this liquid at the outlet of this accumulator, said outlet of said liquid being placed in the upper part of the accumulator and intended to be positioned upward in service.

Thanks to this method, it is possible to obtain precise information on the flow rate leaving the gas accumulator by simply measuring the pressure of the gas above the liquid, which is then used to deduce therefrom the volume of this gas inside the accumulator using the ideal gas equation.

By difference, the volume of liquid inside the accumulator is deduced therefrom, then, by a calculation of integration with respect to time, the volume of liquid leaving the accumulator per unit of time can be deduced therefrom, that is to say the liquid flow rate at the outlet of this accumulator.

In this way, a liquid flow rate measurement at the outlet of the gas accumulator is obtained which is very precise, without it being necessary to use a flowmeter.

It will also be noted that the use of a gas accumulator, that is to say in fact of a simple reservoir comprising a liquid phase surmounted by a gaseous phase, excluding any mechanism of the spring and/or separation membrane type between the two phases, makes it possible to eliminate all risks of seizing or malfunction (hysteresis, etc.) inherent in these mechanisms, as well as to reduce manufacturing costs to a minimum, especially since the pressure sensor and the processing of the information provided by this sensor already form part of the host system in order to ensure pressure regulation.

According to other optional features of the method according to the invention, which can be taken alone or in combination:
- the speed of said pump is controlled as a function of said measured flow rate: this regulation mechanism, which can be controlled by the electronic controller of the vehicle, makes it possible to adjust the speed of the pump to the desired liquid flow rate;
- this method is applied to the measurement of the flow rate of urea used to reduce NOx emissions in the exhaust gases of a diesel engine: this particular application of the method is particularly indicated for this type of engine, in which it is important to be able to carry out precise regulation and control of the flow rate of urea; it is indeed important that the expected volume of urea is actually delivered in order to satisfy the standards applicable to the treatment of exhaust gases from diesel engines;
- this method is applied to the measurement of the flow rate of water used to cool a gasoline engine: this particular application of the method could be suitable for future anti-pollution requirements likely to prohibit the use of fuel to lower the internal temperature of engines.

The present invention also relates to a gas accumulator for implementing the method in accordance with the above, which is noteworthy in that it comprises, in its bottom intended to be positioned downward in service, an inlet of said liquid, and, in its upper part intended to be positioned upward in service, an outlet of said liquid provided with a dip tube, the distance of the end of said dip tube relative to said bottom being calibrated.

Such a gas accumulator makes it possible, thanks to the precise knowledge of the distance separating the end of the tube from the bottom of the accumulator, to know precisely the volume of gas corresponding to the situation in which the level of liquid just reaches the end of the tube.

According to other optional features of this gas accumulator, which can be taken alone or in combination:
- this gas accumulator has a shape whose cross section is reduced toward its bottom: this particular shape of the accumulator makes it possible to reduce the variations in volume of liquid, and therefore of gas, when the inclination of this accumulator is modified, that is to say when the vehicle is traveling on land whose slope varies;
- this gas accumulator comprises a constriction in its middle part: this particular shape of the accumulator makes it possible to reduce gas losses if the free surface is close to the outlet orifice, in particular at low operating pressure.

The present invention also relates to a device for measuring the flow rate of liquid at the outlet of a pump, which is noteworthy in that it comprises an accumulator in accordance with the above, and programmed control means to implement the method in accordance with the above.

BRIEF DESCRIPTION OF THE DRAWINGS

Other features and advantages of the invention will become apparent on reading the following description, with reference to the appended figures, in which:

FIG. 5 illustrates a similar view of this accumulator, the volume V2 of air being less than the volume V1; and FIG. 6 illustrates a similar view of this accumulator, empty of liquid, and presenting a variant form.

For greater clarity, identical or similar elements are denoted by identical or similar reference signs throughout the figures.

DESCRIPTION OF THE PREFERRED EMBODIMENTS

Figure 1:
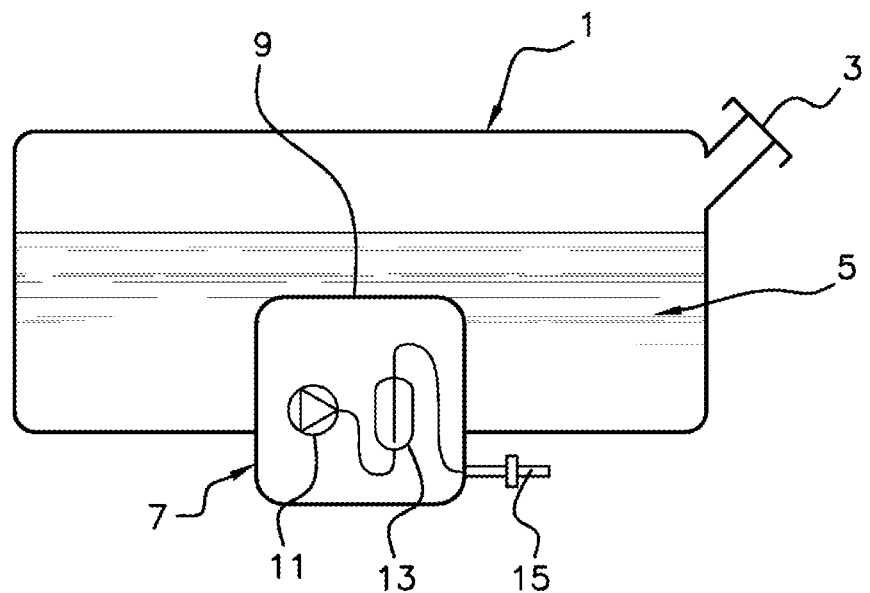
FIG. 1 illustrates a sectional view of a reservoir and housing assembly which may contain a pump and a gas accumulator according to the invention.

Reference is now made to FIG. 1, in which there is shown a reservoir 1 provided with a stopper 3 which can contain a liquid such as an aqueous solution of urea 5.

Urea can be used in the context of the reduction of NOx in the exhaust gases of a motor vehicle diesel engine, but the invention is of course in no way limited to this particular liquid.

It can be applied, for example, to a reservoir containing water to cool a gasoline engine, in accordance with the new anti-pollution standards, or even to a reservoir containing a mixture of water and alcohol, within the context of a hydrogen production device for a vehicle using a fuel cell or a hydrogen cell.

A housing 7, having a common wall 9 with the reservoir 1, contains various components, and in particular a pump 11 communicating with the interior of the reservoir 1 and with a gas accumulator 13 according to the invention, this accumulator being itself connected to an outlet duct 15 making it possible to bring the urea to its point of use on the engine of the vehicle fitted with the assembly which has just been described.

The gas accumulator 13 makes it possible to absorb the pressure variations in the urea circulation circuit, but above all, in the context of the present invention, this gas accumulator makes it possible to measure the flow rate of urea circulating in the outlet duct 15.

Figure 2:
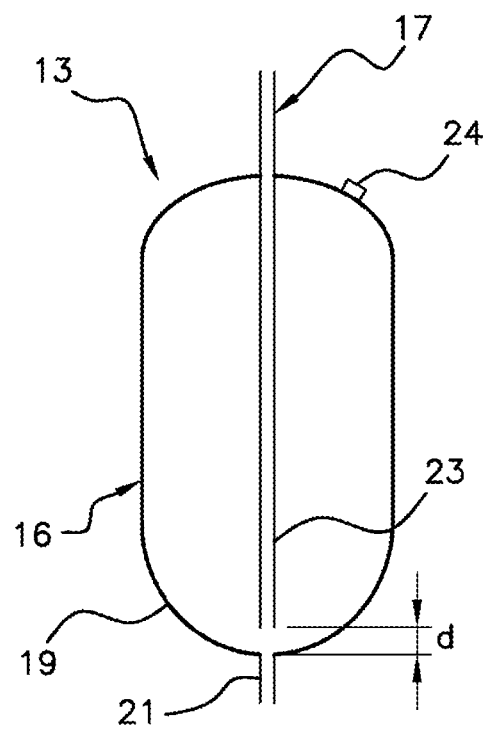
FIG. 2 illustrates a schematic sectional view of a gas accumulator according to the invention, empty of liquid.

More specifically, as can be seen in FIG. 2, the gas accumulator 13 comprises a vessel 16 inside which extends a dip tube 17, the bottom 19 of this vessel being provided with a liquid inlet 21.

Figure 3:
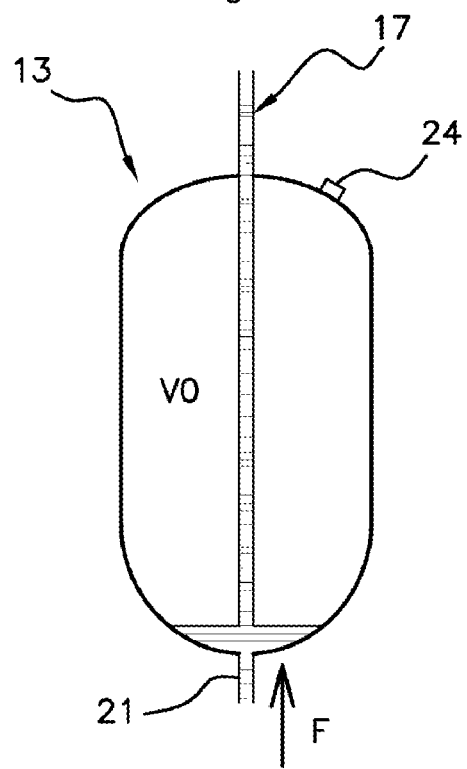
FIG. 3 illustrates a similar view of this accumulator, the volume V0 of air present in this accumulator being such that the liquid level just reaches the lower end of the dip tube of this accumulator.

It is not necessary for this liquid inlet to be located precisely at the bottom of the vessel 16: it suffices that it emerges in this vessel under the surface of the liquid when this liquid just reaches the free end of the dip tube 17 as is visible in FIG. 3, the volume of gas then being V0.

It is important to specify here that the gas accumulator 13 is intended to be positioned on the motor vehicle as shown in FIGS. 2 to 6, that is to say so that the bottom 19 of the vessel 16 and the free end 23 of the dip tube 17 are located downward with respect to the vertical of the place where the vehicle equipped with these components is located.

The distance d separating the end 23 of the dip tube 17 from the bottom 19 is perfectly known, that is to say calibrated, insofar as this length defines the geometric volume V0 of gas surmounting the liquid.

Thus, when the urea enters the vessel 16 through the inlet 21, as indicated by the arrow F in FIG. 3, and its level inside the vessel 16 just reaches the free end of the dip tube 17 as is visible in this figure, the volume V0 of gas surmounting this liquid inside this vessel is perfectly known.

Figure 4:
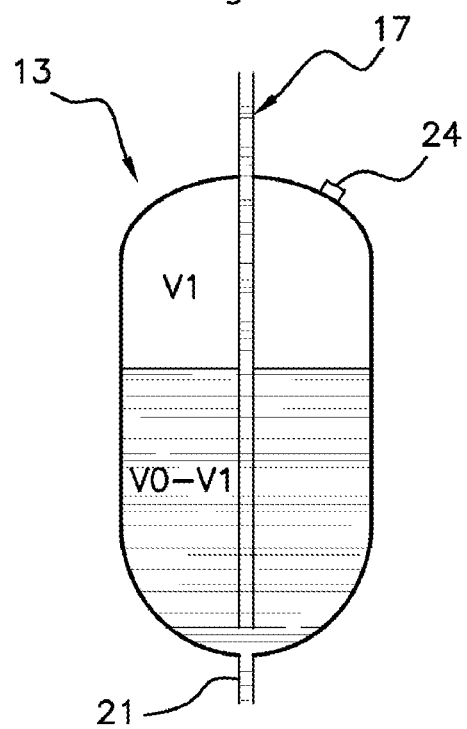
FIG. 4 illustrates a similar view of this accumulator, the volume V1 of air being less than the volume V0.

Subsequently, as the level of urea inside the vessel 16 increases, as shown in FIGS. 4 and 5, the air level above the urea gradually reduces from V0 to V1, then to V2.

Assuming a substantially constant operating temperature, and using the ideal gas equation by virtue of which the product of the air pressure inside the vessel 16 times the volume of this air is substantially constant, it is possible to know this volume at any time if this pressure is known.

Now, the latter is very easily measured by means of a pressure sensor 24 arranged in the upper part of the vessel 16, or of any other device which makes it possible to establish the value of the pressure, such as for example the reading of the current consumed by the motor of the pump 11.

By difference, it is therefore possible at any time to know the volume of urea inside the vessel 16, and, by integration with respect to time, it is therefore possible to deduce therefrom the volume of urea leaving through the dip tube 17 of the vessel 16 per unit of time, that is to say the flow rate of urea at the outlet of the gas accumulator 13.

This flow rate measurement can be used to calibrate once per operating cycle another flow rate measurement device such as a flow rate control using a volumetric pump for example, or during operation if the system allows the metering of the urea to be stopped for a short time, or continuously by controlling the flow rate differential between the metering pump and the metering injector.

The recalibration of the device is carried out automatically when the vehicle engine is switched off: the vessel 16 is vented, allowing the urea located inside this vessel to be purged, then during the next ignition of the engine, a calibrated situation is resumed in which the level of the urea inside this vessel is just situated at the free end 23 of the dip tube 17, as shown in FIG. 3. This operation can be systematic or occasional.

Knowledge of the flow rate of urea at the outlet of the gas accumulator 13 makes it possible, with the electronic controller of the vehicle, to adjust the speed of the pump 11 so as to obtain a flow rate corresponding precisely to a given setpoint.

As can be understood in the light of the preceding description, the method and the gas accumulator according to the invention make it possible to obtain, in a very simple and precise manner, a measurement of the flow rate of the pumped liquid.

No particular mechanical device is necessary, the flow rate measurement being carried out from the sole knowledge of the geometry of the parts forming the gas accumulator 13, and in particular of the geometry of the vessel 16, and of the pressure by whatever means.

Regarding this geometry, it will be noted that it is advantageously possible to provide for the bottom 19 of this vessel to be rounded or to taper downward, as shown in FIGS. 2 to 6, so as to limit the effects of a variation in inclination of the accumulator 13 with respect to the vertical on the variation of the volume of urea inside the vessel 16 by loss of gas, and therefore consequently of the measured air pressure.

It will also be noted that it is advantageously possible to provide for the central part of the vessel 16 to have a constriction 25 as shown in FIG. 6, so as to reduce the surface area of the exchange surface between the liquid and the air located inside the vessel 16, and thus reduce the diffusion of air inside this liquid, which is liable to disturb the precision of the measurements.

In the example set out above, the pump 11 and the gas accumulator 13 have been represented inside the housing 7: this arrangement is particularly suitable in the context of light vehicles, but in a heavy goods vehicle these components can be placed elsewhere, and in particular not be located in the immediate vicinity of the reservoir 1.

In addition, it should be noted that the present invention is not limited to its application to the automotive field: it can be used in any field where it is important to be able to accurately measure a flow rate of liquid at the pump outlet, without implementing a flowmeter or a similar complex mechanical system, as long as the pressure of the liquid can be measured, evaluated or calculated.

Of course, the invention is described in the above by way of example. It is understood that those skilled in the art are able to produce different variant embodiments of the invention without thereby departing from the scope of the invention.

It should be noted in particular that it may be particularly advantageous to place the pressure measurement element in the upper part of the vessel 16 in order to ensure the absence of liquid in front of the sensor when the system is stopped (zero pressure, return of the gas volume to V0), and thus to protect this sensor from the effects of expansion of the liquid in the freezing phase.

The invention claimed is:

1. A method for measuring a flow rate of liquid at an outlet of a pump at which a gas accumulator of a specific volume is provided, a bottom of the gas accumulator being configured to be positioned downward in service, an inlet of said liquid exiting from the pump at a lower part of the gas accumulator, the method comprising:
measuring gas or liquid pressure inside the gas accumulator after the liquid is pumped from the pump through the inlet at the lower part of the gas accumulator to deduce a volume of the gas inside the gas accumulator, then deduce a volume of said liquid inside the gas accumulator, and then deduce a flow rate of the liquid at an outlet of the gas accumulator,
wherein said outlet of said liquid is disposed in an upper part of the gas accumulator and configured to be positioned upward in service.

2. The method as claimed in claim 1, wherein the speed of said pump is controlled as a function of said measured flow rate.

3. The method as claimed in claim 1, wherein the liquid is urea and the flow rate of urea used to reduce NOx emissions in exhaust gases of a diesel engine is measured.

4. The method as claimed in claim 1, wherein the liquid is water and the flow rate of water used to cool a gasoline engine is measured.

5. The method as claimed in claim 1, wherein the inlet is opposite the outlet of the gas accumulator.

6. A device for measuring a flow rate of liquid at an outlet of a pump, the measurement device comprising:
a gas accumulator comprising
a bottom configured to be positioned downward in service,
an inlet of said liquid exiting from the pump at a lower part of the gas accumulator, and
in an upper part configured to be positioned upward in service, an outlet of said liquid provided with a dip tube, a distance of an end of said dip tube relative to said bottom being calibrated, the outlet of the liquid being disposed in an upper part of the gas accumulator and configured to be positioned upward in service;
a sensor configured to measure gas or liquid pressure inside the gas accumulator after the liquid is pumped from the pump through the inlet at the lower part of the gas accumulator; and
a controller configured to
deduce a volume of the gas inside the gas accumulator, then deduce a volume of said liquid inside the gas accumulator, and
then deduce the flow rate of the liquid at an outlet of the gas accumulator.

7. A method for measuring a flow rate of liquid at an outlet of a pump at which a gas accumulator of a specific volume is provided, a bottom of the gas accumulator being configured to be positioned downward in service, an inlet of said liquid exiting from the pump at a lower part of the gas accumulator, the method comprising:
measuring gas or liquid pressure inside the gas accumulator to deduce a volume of the gas inside the accumulator, then deduce a volume of said liquid inside the accumulator, and then deduce a flow rate of the liquid at an outlet of the gas accumulator,
wherein said outlet of said liquid is disposed in an upper part of the gas accumulator and configured to be positioned upward in service,
wherein the speed of said pump is controlled as a function of said measured flow rate,
the liquid is urea, and
the flow rate of urea used to reduce NOx emissions in the exhaust gases of a diesel engine is measured.

8. A method for measuring a flow rate of liquid at an outlet of a pump at which a gas accumulator of a specific volume is provided, a bottom of the gas accumulator being configured to be positioned downward in service, an inlet of said liquid exiting from the pump at a lower part of the gas accumulator, the method comprising:
measuring gas or liquid pressure inside the gas accumulator to deduce a volume of the gas inside the accumulator, then deduce a volume of said liquid inside the accumulator, and then deduce a flow rate of the liquid at an outlet of the gas accumulator,
wherein said outlet of said liquid is disposed in an upper part of the gas accumulator and configured to be positioned upward in service,
wherein the speed of said pump is controlled as a function of said measured flow rate,
the liquid is water, and
the flow rate of water used to cool a gasoline engine is measured.

* * * * *